US009575332B2

(12) United States Patent
Qiu et al.

(10) Patent No.: US 9,575,332 B2
(45) Date of Patent: Feb. 21, 2017

(54) METHOD FOR APPLYING A COATING ONTO A SILICONE HYDROGEL LENS

(71) Applicant: Novartis AG, Basel (CH)

(72) Inventors: Yongxing Qiu, Duluth, GA (US); Arturo Norberto Medina, Suwanee, GA (US); John Dallas Pruitt, Suwanee, GA (US)

(73) Assignee: NOVARTIS AG, Basel (CH)

( * ) Notice: Subject to any disclaimer, the term of this patent is extended or adjusted under 35 U.S.C. 154(b) by 580 days.

(21) Appl. No.: 14/101,640

(22) Filed: Dec. 10, 2013

(65) Prior Publication Data

US 2014/0174031 A1 Jun. 26, 2014

Related U.S. Application Data

(60) Provisional application No. 61/735,778, filed on Dec. 11, 2012.

(51) Int. Cl.
*G02B 1/04* (2006.01)
*B29D 11/00* (2006.01)
*B65B 25/00* (2006.01)
*G02C 7/04* (2006.01)
*B65B 55/02* (2006.01)

(52) U.S. Cl.
CPC ........... *G02C 7/04* (2013.01); *B29D 11/00865* (2013.01); *B65B 55/02* (2013.01); *G02B 1/043* (2013.01)

(58) Field of Classification Search
CPC ......... G02B 1/043; G02C 7/049; G02C 7/022; B29D 11/00865
USPC .......................... 351/159.01, 159.33; 427/2.1
See application file for complete search history.

(56) References Cited

U.S. PATENT DOCUMENTS

| | | | |
|---|---|---|---|
| 5,461,433 A | 10/1995 | Nakabayashi | |
| 5,700,559 A * | 12/1997 | Sheu | A61L 27/34 428/319.7 |
| 6,099,122 A | 8/2000 | Chabrecek | |
| 6,436,481 B1 | 8/2002 | Chabrecek | |
| 6,440,571 B1 | 8/2002 | Valint, Jr. | |
| 6,447,920 B1 | 9/2002 | Chabrecek | |
| 6,465,056 B1 | 10/2002 | Chabrecek | |
| 6,500,481 B1 | 12/2002 | Vanderlaan | |
| 6,521,352 B1 | 2/2003 | Chabrecek | |
| 6,586,038 B1 | 7/2003 | Chabrecek | |
| 6,623,747 B1 | 9/2003 | Chatelier | |
| 6,699,435 B2 * | 3/2004 | Salpekar | A61L 12/08 134/42 |
| 6,730,366 B2 | 5/2004 | Lohmann | |
| 6,734,321 B2 | 5/2004 | Chabrecek | |
| 6,835,410 B2 | 12/2004 | Chabrecek | |
| 6,878,399 B2 * | 4/2005 | Chabrecek | A61L 27/34 427/162 |
| 6,896,926 B2 * | 5/2005 | Qiu | A61L 27/34 427/2.1 |
| 6,923,978 B2 | 8/2005 | Chatelier | |
| 8,044,112 B2 * | 10/2011 | Matsuzawa | C08J 7/04 351/159.33 |
| 2004/0067365 A1 * | 4/2004 | Qiu | A61L 27/34 428/411.1 |
| 2007/0122540 A1 | 5/2007 | Salamone | |
| 2008/0100796 A1 * | 5/2008 | Pruitt | A61L 12/04 351/159.33 |
| 2008/0142038 A1 | 6/2008 | Kunzler | |
| 2008/0226922 A1 * | 9/2008 | Ferreiro | C08J 7/04 428/413 |
| 2009/0145086 A1 | 6/2009 | Reynolds | |
| 2009/0145091 A1 | 6/2009 | Connolly | |
| 2009/0238948 A1 * | 9/2009 | Muller | B29D 11/00865 427/2.1 |
| 2011/0134387 A1 | 6/2011 | Samuel | |
| 2012/0026457 A1 * | 2/2012 | Qiu | G02B 1/043 351/159.33 |
| 2012/0026458 A1 | 2/2012 | Qiu | |
| 2012/0029111 A1 * | 2/2012 | Chang | C08G 77/388 523/107 |
| 2013/0337160 A1 * | 12/2013 | Holland | C09D 139/04 427/162 |

FOREIGN PATENT DOCUMENTS

WO     2013188274 A2    12/2013

OTHER PUBLICATIONS

PCT International Search Report dated Feb. 20, 2014, International Application No. PCT/US2013/074043, International Filing Date Dec. 10, 2013.
PCT Written Opinion of the International Searching Authority dated Feb. 20, 2014, International Application No. PCT/US2013/074043, International Filing Date Dec. 10, 2013.

* cited by examiner

*Primary Examiner* — Cachet Sellman
(74) *Attorney, Agent, or Firm* — Sheng-Hsin Hu

(57) ABSTRACT

The present invention generally relates to a method for applying a coating of hydrophilic polymers onto silicone hydrogel contact lenses to improve hydrophilicity and lubricity. In particular, the present invention is directed to a method for forming a coating on a contact lens, preferably a silicone hydrogel contact lens, directly in the primary package and maintaining the coated contact lens within said primary package until insertion of the coated contact lens in the eye of the contact lens user. The resultant silicone hydrogel contact lens has a coating with good hydrophilicity, improved lubricity and good durability and also can be used directly from the lens package by a patient without washing and/or rising.

7 Claims, No Drawings

US 9,575,332 B2

METHOD FOR APPLYING A COATING ONTO A SILICONE HYDROGEL LENS

This application claims the benefit under 35 USC §119(e) of U.S. provisional application No. 61/735,778 filed Dec. 11, 2012, incorporated by reference in its entirety.

The present invention generally relates to a method for applying a coating of hydrophilic polymers onto silicone hydrogel contact lenses to improve hydrophilicity and lubricity. In particular, the present invention is directed to a method for forming a coating on a contact lens, preferably a silicone hydrogel contact lens, directly in the primary package and maintaining the coated contact lens within said primary package until insertion of the coated contact lens in the eye of the contact lens user.

BACKGROUND OF THE INVENTION

In recent years, soft silicone hydrogel contact lenses, for example, Focus NIGHT & DAY™ and O2OPTIX™ (CIBA VISION), and PureVision™ (Bausch & Lomb) become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, a silicone hydrogel material typically has a surface or at least some areas of its surface which is hydrophobic (non-wettable). Lipids or proteins from the ocular environment can be adsorbed onto hydrophobic surface or surface areas of a silicone hydrogel contact lens. The hydrophobic surface or surface areas of a silicone hydrogel contact lens may cause it be adhered to the eye. Thus, a silicone hydrogel contact lens will generally require a surface modification to increase surface hydrophilicity.

A known method for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be used in rendering a silicone hydrogel material wettable, they may not be cost-effective and/or time-efficient for implementation in a mass production environment, because they typically require relatively long time and/or involve laborious, multiple steps to obtain a hydrophilic coating.

Therefore, there is a need for a method of applying hydrophilic coating to a silicone hydrogel contact lens in a cost-effective and time-efficient manner.

SUMMARY OF THE INVENTION

The invention, in one aspect, provides a method for applying an ophthalmic product having a lubricous and wettable surface, comprising the steps of:

(1) obtaining a silicone hydrogel contact lens,
(2) placing the silicone hydrogel contact lens in a lens package containing an in-package-coating solution, wherein the in-package-coating solution comprises:
   (A) a polyanionic polymer having carboxyl groups,
   (B) at least one water-soluble and thermally-crosslinkable polymeric material comprising azetidinium groups,
   (C) at least one decomposable-at-autoclave material, wherein the in-package-coating solution has a pH of from about 1.0 to about 4.0, provided that the molar charge ratio of the polyanionic polymer and the water-soluble and thermal-crosslinkable polymeric material comprising azetidinium groups is from 1:100 to 100:1 and no precipitation is formed after mixings, wherein the polyanionic polymer attaching and forming at least one layer coating on the surface of the silicone hydrogel contact lens,
(3) Sealing the lens package with the contact lens and the in-package-coating solution having the pH of from about 1.0 to about 4.0,
(4) Autoclaving said package with the contact lens and the in-package-coating solution therein, thereby inducing crosslinking reaction between azetidinium groups of the water-soluble polymeric material and the carboxyl groups of the polyanionic polymer to form a crosslinked hydrophilic coating on the surface of the silicone hydrogel contact lens immersed in the in-package-coating solution, wherein the decomposable-at-autoclave material is hydrolyzed to increase the pH to 6.5 to 7.5, wherein the silicone hydrogel contact lens with the crosslinked hydrophilic coating thereon has a surface wettability characterized by having an averaged water contact angle of about 80 degrees or less and having improved lubricity as compared to uncoated lenses.

In another aspect, this invention provides a method for applying an ophthalmic product having a lubricous and wettable surface, comprising the steps of:

(1) obtaining a silicone hydrogel contact lens,
(2) placing the silicone hydrogel contact lens in a lens package containing an polyanionic polymer solution for more than 10 seconds to form a layer of the polyanionic polymer coating on the hydrogel contact lens, wherein the polyanionic polymer having carboxyl groups and the solution having a pH of 1.0 to 4.0, and then
(3) adding a water-soluble and thermal-crosslinkable polymeric material comprising azetidinium groups to the lens package of the step (2) containing the polyanionic polymer solution to form an in-package-coating solution, provided that the molar charge ratio of the polyanionic polymer and the water-soluble and thermal-crosslinkable polymeric material comprising azetidinium groups is from 1:100 to 100:1 and no precipitation is formed after mixing, wherein the in-package-coating solution having a pH higher than 6,
(4) sealing the lens package with the contact lens and the in-package-coating solution,
(6) autoclaving said package with the contact lens and the in-package-coating solution therein, thereby inducing crosslinking reaction between azetidinium groups of the water-soluble and thermal-crosslinkable polymeric material and the carboxyl groups of the polyanionic polymer to form an in-package crosslinked hydrophilic coating on the surface of the silicone hydrogel contact lens, wherein the silicone hydrogel contact lens with the crosslinked hydrophilic coating thereon has a surface wettability characterized by having an averaged water contact angle of about 80 degrees or less and having improved lubricity as compared to uncoated lenses.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that includes an actinically-crosslinkable group and can be polymerized actinically or thermally. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation ethylenically unsaturated groups, thiol groups, ene-containing groups. Ethylenically unsaturated groups can undergo free-radical chain reaction upon actinic irradiation. Thiol groups (—SH) and ene-containing groups can participate in thiol-ene step-growth radical polymerization as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION", herein incorporated in reference in its entirety.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

An "ene-containing group" is a mono-valent or divalent radical contains a carbon-carbon double which is not directly linked to a carbonyl group (—CO—), nitrogen atom, or oxygen atom and is defined by any one of formula (I)-(III)

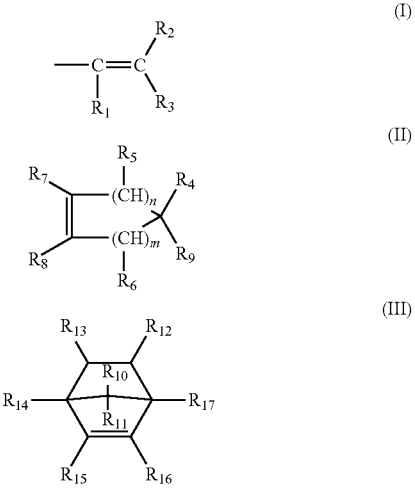

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_{10}$-$R_{17}$ are divalent radicals.

A "vinylic monomer", as used herein, refers to a monomer that has an ethylenically unsaturated group and can be polymerized actinically or thermally.

A "hydrophilic vinylic monomer", as used herein, refers to a vinylic monomer which as a homopolymer typically yields a polymer that can absorb at least 10 percent by weight water.

A "hydrophobic vinylic monomer", as used herein, refers to a vinylic monomer which as a homopolymer typically yields a polymer that can absorb less than 10 percent by weight of water.

A "macromer" refers to a medium and high molecular weight compound which includes one or more actinically-crosslinkable group and can be polymerized and/or crosslinked. Medium and high molecular weight typically means average molecular weights greater than 700 Daltons. In accordance with the invention, an actinically-polymerizable macromer can be a macromer with one or more ethylenically unsaturated groups or with two or more thiol or ene-containing groups, which can participate in either free radical chain growth polymerization or thiol-ene step-growth radical polymerization.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

A "polymer" means a material formed by polymerizing/crosslinking one or more monomers.

A "backbone" of a polymer refers to the principle chain in a polymer molecule.

As used herein, the term "multiple" refers to three or more.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

An "azetidinium group" refers to a positively charged group of

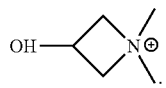

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "reactive vinylic monomer" refers to a vinylic monomer having a carboxyl group or an amino group (i.e., a primary or secondary amino group).

The term "water-soluble" in reference to a polymer means that the polymer can be dissolved in water to an extent sufficient to form an aqueous solution of the polymer having a concentration of up to about 30% by weight at room temperature (defined above).

A "water contact angle" refers to an average water contact angle (i.e., contact angles measured by Sessile Drop method), which is obtained by averaging measurements of contact angles with at least 3 individual contact lenses.

As used herein, a "polyanionic material" refers to a polymeric material that has a plurality of negative charged groups or ionizable groups.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (measured by Sessile Drop method), which is obtained by averaging measurements of at least three individual contact lenses.

As used herein, "increased surface hydrophilicity" or "increased hydrophilicity" in reference to a contact lens means that the contact lens autoclaved in a packaging solution of the invention has a smaller averaged (water) contact angle relative to that of a control contact lens autoclaved in a buffered saline packaging solution without water-soluble and thermal-crosslinkable polymeric, a polyanionic material and at least one hydrolysable-at-autoclave material, wherein all contact lenses are made of the same core material.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a digital rubbing test.

As used herein, "surviving a digital rubbing test" in reference to a coating on a contact lens means that after digitally rubbing the lens with Solo-Care® (CIBA Vision) or an equivalent, there is no noticeable increase in staining area on the lens relative to the staining of a lens of same without rubbing, as described in Example 1. In accordance with the invention, a silicone hydrogel contact lens of the invention has a coating that is capable of surviving preferably at least 5, more preferably at least 10, even more preferably at least 20 consecutive digital rubbing tests.

As used herein, the term "a neutral pH" in reference to a solution means that the pH of the solution is from about 6.0 to about 8.0.

In general, the invention is directed to a cost-effective surface treatment method for making silicone hydrogel contact lenses with durable hydrophilic coatings. The invention is partly based on the discovery that when decomposable-at-autoclave material (i.e., hydrolysable-at-autoclave materials), for example, such as, urea, ammonium carbamate, ester (e.g., polyvinyl acetate), or anhydride, is added into a lens packaging solution, they can be hydrolyzed during autoclave process (i.e., sterilization of the lens packages). The hydrolysis products of such material can change the pH of the packaging solution from a low or high value to a neutral value (e.g., around pH=7). As such, the initial (prior to autoclave) and final (posterior autoclave) pH values of a lens packaging solution can be controlled as one desires.

The invention is also partly based on the discovery that a lubricous and wettable coating can be applied onto a silicone hydrogel contact lens, in situ, directly in a lens package containing a lens packaging solution including a decomposable-at-autoclave material (hydrolysable-at-autoclave material) and under optimal coating conditions for forming a coating with good hydrophilicity, intactness and durability on a silicone hydrogel contact lens.

The invention is further partly based on the discovery that a lubricous and wettable coating can be applied onto a silicone hydrogel contact lens, in situ, directly in a lens package containing a lens packaging solution comprising (A) a polyanionic polymer having carboxyl groups, (B) at least one water-soluble polymeric material comprising azetidinium groups, (C) at least one decomposable-at-autoclave material, and under optimal coating conditions for forming an lubricous and wettable coating with good intactness and durability on a silicone hydrogel contact lens. Although the inventors do not wish to be bound by any particular theory, it is believed that through hydrophobic-hydrophobic interaction, the hydrophobic backbone of a coating material may strongly interact with the hydrophobic surface areas of a silicone hydrogel contact lens to anchor the coating material onto the lens surface. At extreme pH, e.g., at low pH, the ionizable groups of a polyanionic material may not be ionized and the hydrophobic backbone of the polyanionic material may have the strongest interaction with the hydrophobic surface areas of a silicone hydrogel contact lens. The water-soluble, azetidinium-containing polymeric material is thermally-crosslinkable (reactive) due to the presence of azetidinium groups with carboxyl groups of the polyanionic material which is introduced to the hydrophobic surface areas of a silicone hydrogel contact lens to form a cross-linked coating on a silicone hydrogel contact lens.

It is also believed that at a higher coating temperature, molecules of a coating material might be able to be in more close contact with the hydrophobic surface areas of the lens and then "trapped" there once the temperature drops.

Contact lenses, which are hydrated and packaged in solution, must be sterilized. Sterilization of the hydrated lenses during manufacturing and packaging is typically accomplished by autoclaving. The autoclaving process involves heating the packaging of a contact lens to a temperature of about 121° C. for approximately 20-30 minutes under pressure. Since contact lenses in the lens packages typically need to be sterilized by autoclave at about 121° C., an in situ lubricous and wettable coating of a silicone hydrogel contact lens can be carried out at high temperature and at extreme pH (at least for the first several minutes of autoclave). It is discovered that, by incorporating in the lens packaging solution a hydrolysable-at-autoclave material which can produce base or acid during hydrolysis process, the final pH of the packaging solution can be automatically adjusted to a neutral pH value after autoclave. By using the method of the invention, the coating process is combined with the sterilization step (autoclave) in the manufacturing of silicone hydrogel contact lenses. No prior surface treatment is needed. The resultant contact lenses not only can have a surface having high lubricous and wettable and good intactness and durability, but also can be used directly from the lens package by a patient without washing and/or rising because of the neutral pH and adequate tonicity of the packaging solution.

As used herein, an "in situ lubricous and wettable coating process" is intended to describe a process in which a lubricous and wettable coating is applied onto a contact lens directly in a lens package which is supplied to a customer. Any lens packages known to a person skilled in the art can be used in the invention.

It is believed that during autoclave those azetidinium groups which do not participate in crosslinking reaction may be hydrolyzed into 2,3-dihydroxypropyl (HO—$CH_2$—CH (OH)—$CH_2$—) groups and that the azetidinium-containing polymeric material present in the lens packaging solution, if applicable, can be converted to a non-reactive polymeric wetting material capable of improving a lens's insert comfort.

By using the method of the invention, the coating process can be combined with the sterilization step (autoclave) in the manufacturing of silicone hydrogel contact lenses. The resultant contact lenses not only can have a high surface hydrophilicity/wettability, no or minimal surface changes, good intactness, and good durability, but also can be used directly from the lens package by a patient without washing and/or rising because of the ophthalmic compatibility of the packaging solution.

The invention is generally directed to a cost-effective and time-efficient method for making silicone hydrogel contact lenses with durable hydrophilic coatings by use of a water-soluble and thermally-crosslinkable hydrophilic polymeric material having azetidinium groups.

The invention, in one aspect, provides a method for applying an ophthalmic product having a lubricous and wettable surface, comprising the steps of:
(1) obtaining a silicone hydrogel contact lens,
(2) placing the silicone hydrogel contact lens in a lens package containing an in-package-coating solution, wherein the in-package-coating solution comprises:
  (A) a polyanionic polymer having carboxyl groups,
  (B) at least one water-soluble and thermally-crosslinkable polymeric material comprising azetidinium groups,
  (C) at least one decomposable-at-autoclave material, wherein the in-package-coating solution has a pH of from about 1.0 to about 4.0, provided that the molar charge ratio of the polyanionic polymer and the water-soluble and thermal-crosslinkable polymeric material comprising azetidinium groups is from 1:100 to 100:1 and no precipitation is formed after mixings, wherein the polyanionic polymer attaching and forming at least one layer coating on the surface of the silicone hydrogel contact lens,
(3) Sealing the lens package with the contact lens and the in-package-coating solution having the pH of from about 1.0 to about 4.0,
(4) Autoclaving said package with the contact lens and the in-package-coating solution therein, thereby inducing crosslinking reaction between azetidinium groups of the water-soluble polymeric material and the carboxyl groups of the polyanionic polymer to form a cross-linked hydrophilic coating on the surface of the silicone hydrogel contact lens immersed in the in-package-coating solution, wherein the decomposable-at-autoclave material is hydrolyzed to increase the pH to 6.5 to 7.5, wherein the silicone hydrogel contact lens with the crosslinked hydrophilic coating thereon has a surface wettability characterized by having an averaged water contact angle of about 80 degrees or less and having improved lubricity as compared to uncoated lenses.

In accordance with the invention, the packaging solution is an aqueous solution which is ophthalmically safe. The term "ophthalmically safe" with respect to an aqueous solution for sterilizing and storing contact lenses is meant that a contact lens stored in the solution is safe for direct placement on the eye without rinsing, that is, the solution is safe and sufficiently comfortable for daily contact with the eye via a contact lens. An ophthalmically safe solution has a tonicity and pH that is compatible with the eye and comprises materials, and amounts thereof, that are non-cytotoxic according to international ISO standards and U.S. FDA regulations.

The term "compatible with the eye" means a solution that may be in intimate contact with the eye for an extended period of time without significantly damaging the eye and without significant user discomfort.

A variety of packages can be used to store contact lenses, including for example, vials, blister packages or equivalents. In particular, so-called blister packages are widely used for the storage and dispensing of the contact lenses. Typically, the blister package for storing and dispensing a contact lens includes an injection-molded or thermoformed plastic base portion incorporating a molded cavity which is surrounded by an outstanding planar flange about the rim of the cavity. The plastic base portion is made of plastic material. A flexible cover sheet is adhered to the surface of the flange so as to seal or enclose the cavity in a generally liquid-tight mode. Within the cavity of the base portion, a contact lens is immersed in a sterile aqueous solution, such as an isotonic saline solution.

The base portion may be formed from a variety of plastic materials, but is preferably transparent to allow the user to inspect the lens without opening the storage package. The plastic material should be capable of being sterilized at 120° C. without substantial loss of its physical properties of dimensional stability, warpage, and shrinkage. The plastic material should have low water and vapor permeability to prevent the evaporation and loss of the lens care solution. The plastic material should not be permeable to bacteria and oxygen in order to avoid contamination and to keep the efficacy of the solution. Preferably, plastic materials should have a high strength and a high tolerance, in view of the cost and efficiency in manufacturing the base portion and easiness in handling the material.

Examples of plastic materials include without limitation fluoro-resin, polyamide, polyacrylate, polyethylene, nylons, olefin co-polymers (e.g., copolymers of polypropylene and polyethylene), polyethylene terephthalate, poly vinyl chloride, non-crystalline polyolefin, polycarbonate, polysulfone, polybutylene terephthalate, polypropylene, polymethyl pentene, polyesters, rubbers, urethanes, and the like. These materials are adopted solely or alternatively in a composite body or a laminar structure. The plastic material used to make the base is preferably polypropylene.

The base portion is preferably prepared by injection molding or thermoforming and may be in any desired forms.

The cavity of the base portion may be suitably designed and sized with no limitation to receive the lens and the sufficient quantity of sterile preserving solution to completely submerge the lens. The cavity may have a variety of shapes in plane view, including a circular shape, a polygonal shape, an ellipsoidal shape, a heart shape, and the like. The surface of the cavity may be desirably shaped depending upon a specific configuration, size and the like of an ophthalmic lens to be received in the cavity. For instance, the surface of the cavity may have a hemisphere (concave) shape.

In accordance with the present invention, at least the surface of the cavity of a base portion is modified by surface treatment. The surface treatment can be performed by a variety of methods, including without limitation plasma treatment, plasma coating, corona discharge, LbL coating, flame treatment and acid surface etching treatment. Preferably, the surface treatment is corona discharge, plasma treatment, or LbL coating.

Typically, the base comprises a flange portion extending about the cavity containing a soft contact lens in a sterile packaging solution, so as to ensure that at least the cavity is appropriately sealed by a flexible cover sheet.

The cover sheet may be a single film or alternatively a multi-layered film and any film may be adopted as the cover sheet as long as the film is capable of being sealed to the container base by bonding, welding or other similar methods. The flexible cover sheet may be formed of a variety of water-impermeable materials and may have a variety of thicknesses. The sheet must be sufficiently flexible to enable the user to easily remove the sheet from the base portion. The cover sheet is preferably a laminate material preferably comprising a metal foil layer and at least one, preferably two polymer layers, e.g. polypropylene, coating the foil. The preferred foil is aluminum. Preferably, the sheet is formed from a metal (e.g., aluminum) foil or foil composite.

The cover sheet may be printed with information regarding the contact lens contained in the package or with other information for the end user or the dealer. The base may be affixed to the flexible cover sheet by a number of methods. However, the strength of the bond between the base and sheet should not be excessive, i.e., the user should be able to easily and quickly separate the sheet from the base. For example, the cover sheet can be sealed to the base or flange thereof by means of temperature or ultrasonic treatment or by another appropriate adhesion method.

It should be understood that a plurality of base parts, e.g., four base parts, advantageously form one unit, so that handling of the base parts in the manufacturing process is simplified.

In accordance with the invention, a polyanionic material for forming a coating on contact lens has a hydrophobic backbone. Although the inventors do not wish to be bound by any particular theory, it is believed that through hydrophobic-hydrophobic interaction, the hydrophobic backbone of a coating material may strongly interact with the hydrophobic surface areas of a silicone hydrogel contact lens to anchor the coating material onto the lens surface.

The polyanionic materials that may be employed in the present invention include polyanionic polymers with a hydrophobic backbone and charged or ionizable pendant groups.

Examples of suitable polyanionic polymers include, without limitation a linear polyacrylic acid (PAA), a branched polyacrylic acid, a polymethacrylic acid (PMA), a copolymer of acrylic acid, a copolymer of methacrylic acid, a maleic or fumaric acid copolymer, a poly(styrenesulfonic acid) (PSS). Examples of a branched polyacrylic acid include a Carbophil® or Carbopol® type from Goodrich Corp. Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. A preferred polyanionic polymer with a hydrophobic backbone is a polymer containing carboxyl groups (—COOH). It is believed that carboxyl groups can be protonated at a pH of about 1 to about 3. A more preferred polyanionic polymer with a hydrophobic backbone is a linear or branched polyacrylic acid or an acrylic acid copolymer. A more preferred anionic polymer is a linear or branched polyacrylic acid. A branched polyacrylic acid in this context is to be understood to be a polyacrylic acid obtainable by polymerizing acrylic acid in the presence of suitable (minor) amounts of a di- or multi-vinyl compound.

In according with the present invention, a water-soluble, azetidinium-containing, and thermally-crosslinkable hydrophilic polymeric material is a partial reaction product of a polyamine-epichlorohydrin or polyamidoamine-epichlorohydrin with at least one hydrophilicity-enhancing agent having at least one reactive functional group selected from the group consisting of carboxyl group, can be used to form a crosslinked coating with a good surface hydrophilicity and/or wettability, a good hydrophilicity and a good intactness on a silicone hydrogel contact lens having carboxyl acid at or near its surface. At a relatively elevated temperature (defined above), positively-charged azetidinium groups react with functional groups such as amino groups, thiol groups, and carboxylate ion —COO⁻ (i.e., the deprotonated form of a carboxyl group) to form neutral, hydroxyl-containing covalent linkages as illustrated in the scheme I Scheme I

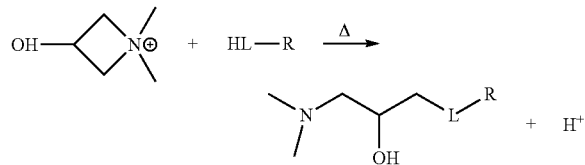

in which R is the rest portion of a compound, L is —NR'— in which R' is hydrogen, a $C_1$-$C_{20}$ unsubstituted or substituted, linear or branched alkyl group or a polymer chain —S—, or —OC(=O)—. Because of the thermally-controllable reactivity of azetidinium groups, polyamine-epichlorohydrin or polyamidoamine-epichlorohydrin (PAE) has been widely used as a wet-strengthening agent. However, PAE has not been successfully used to form crosslinked coatings on contact lenses, probably because crosslinked PAE coatings may not be able to impart desirable hydrophilicity, wettability, and lubricity to contact lenses. It is surprisingly discovered here that PAE can be chemically-modified with a hydrophilicity-enhancing agent (especially a hydrophilic polymer) having one or more functional groups each capable of reacting with one azetidinium group, in a "heat-pretreatment" or "pretreatment" process, to obtain a water-soluble, azetidinium-containing polymeric material. Such polymeric material, which is still thermally-crosslinkable (reactive) due to the presence of azetidinium groups, can be used to form a crosslinked coating on a silicone hydrogel contact lens having reactive functional groups (e.g., amino groups, carboxyl groups, thiol groups, or combinations thereof) on and/or near its surface. It is further surprising discovered here that a lubricous and wettable coating can be applied onto a silicone hydrogel contact lens, in situ, directly in a lens package containing a lens packaging solution comprising (A) a polyanionic polymer having carboxyl groups, (B) at least one reactive-at-autoclave material, such as a water-soluble polymeric material comprising azetidinium groups, (C) at least one decomposable-at-autoclave material, and under optimal coating conditions for forming an lubricous and wettable coating with good intactness and durability on a silicone hydrogel contact lens.

It is believed that a hydrophilicity-enhancing agent may play at least two roles in increasing the performance of resultant crosslinked coatings: adding hydrophilic polymer chains onto a polyamine or polyamidoamine polymer chain to form a highly-branched hydrophilic polymeric material with dangling polymer chains and/or chain segments; and decreasing the crosslinking density of the crosslinked coating by reducing significantly the number of azetidinium groups of the crosslinkable polymeric material (coating material). A coating with a loose structure and dangling polymer chains and/or chain segments is believed to impart a good surface hydrophilicity, wettability and/or lubricity.

In according with the present invention, any suitable hydrophilicity-enhancing agents can be used in the invention so long as they contain at least one amino group, at least one carboxyl group, and/or at least one thiol group.

A preferred class of hydrophilic polymers as hydrophilicity-enhancing agents include without limitation: a copolymer which is a polymerization product of a composition comprising (1) about 50% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer and/or at least one phosphorylcholine-containing vinylic monomer; and combinations thereof. Reactive vinylic monomer(s) and non-reactive hydrophilic vinylic monomer(s) are described below.

Examples of reactive polymers include without limitation: a homopolymer of a reactive vinylic monomer; a copolymer of two or more reactive vinylic monomers; a copolymer of a reactive vinylic monomer with one or more non-reactive hydrophilic vinylic monomers (i.e., hydrophilic vinylic monomers free of any carboxyl or (primary or secondary) amino group).

Examples of preferred reactive polymers are polyacrylic acid, polymethacrylic acid, poly($C_2$-$C_{12}$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

Preferred examples of non-reactive hydrophilic vinylic monomers free of carboxyl or amino group include without limitation acrylamide (AAm), methacrylamide N,N-dimethylacrylamide (DMA), N,N-dimethylmethacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropylmethacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl(meth)acrylate, hydroxypropyl(meth)acrylate, $C_1$-$C_4$-alkoxy polyethylene glycol(meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof.

In accordance with the invention, the reaction between a hydrophilicity-enhancing agent and an epichlorohydrin-functionalized polyamine or polyamidoamine is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to an epichlorohydrin-functionalized polyamine or polyamidoamine must be selected not to render a resultant hydrophilic polymer material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

Products and processes of making the water-soluble and thermal-crosslinkable hydrophilic polymer material containing azetidinium groups and hydrophiliclicity-enhancing agent are disclosed in commonly assigned U.S. Patent application US 2012/0026457 A1, herein incorporated by reference in its entirety.

To control the amount of each polyionic component in an in-package-coating solution, the molar charge ratio can be varied. As used herein, "molar charge ratio" is defined as the ratio of ionic groups or charged functional groups in the solution on a molar basis. For example, a 10:1 molar charge ratio can be defined as 10 charged functional groups of a polyanion to 1 charged functional group of a water-soluble and thermally-crosslinkable polymeric material comprising azetidinium groups (i.e. polycation). The molar charge ratio can be determined as defined above for any number of components within a solution, as long as at least one polycation and one polyanion are included therein. An in-package-coating coating solution typically has a molar charge ratio from 1:100 to 100:1 provided that no precipitation is formed after mixings. The coating solution could have a molar charge ratio of about 20:1 to 1:20 (polyanion:polycation) provided that no precipitation is formed after mixings. The coating solution could have a molar charge ratio of about 1:10 to 10:1 (polyanion:polycation) provided that no precipitation is formed after mixings. In still another example, a 5:1 to 1:5 molar charge ratio may be utilized provided that no precipitation is formed after mixings.

In accordance with the invention, the step of autoclaving is performed preferably by heating the silicone hydrogel contact lens immersed in a packaging solution (i.e., a buffered aqueous solution) in a sealed lens package at a temperature of from about 118° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, and polyvinylpyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris(Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris (hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

Any materials, which can be hydrolyzed during autoclave to produce an acidic or base material, can be used as hydrolysable-at-autoclave material in the invention. Examples of preferred as hydrolysable-at-autoclave materials include without limitation urea, ammonium carbamate, water-soluble polyvinyl acetates, esters, anhydrides, and the like. Urea and ammonium carbamate can be hydrolyzed during autoclave to form ammonium as hydrolysis product to increase a solution's pH. Polyvinyl acetates, esters and anhydrides can be hydrolyzed during autoclave to form acid as hydrolysis product to decrease a solution's pH. The amount of the hydrolysable-at-autoclave material in the packaging solution should be sufficient to impart a final neutral pH (i.e., from about 6.0 to about 8.0) to the packaging solution after autoclave. According to the present invention, the amount of decomposable-at-autoclave material (hydrolysable-at-autoclave material) ranges preferably from 0.001% to 2%, preferably from 0.01% to 1%; most preferably from about 0.05% to about 0.30% by weight.

In an embodiment, the in-package-coating solution has an initial pH between 1 to 4.0, preferably, between 1.5 to 3, even more preferably between 2 to 2.5 and comprises a polyanionic material having a hydrophobic backbone and pendant ionizable groups, urea or ammonium carbamate as hydrolysable-at-autoclave material, and one water-soluble polymeric material comprising azetidinium groups. Preferably, the concentration of the polyanionic material is higher than that of the water-soluble polymeric material comprising azetidinium groups. Where the packaging solution has a low pH, the pendant ionizable groups of the polyanionic can be prevented from being ionized (i.e., becoming charged groups) and the hydrophobic-hydrophobic interactions between the hydrophobic backbone of the polyanionic material and the hydrophobic surface areas of a silicone hydrogel contact lens can be increased. It is believed that the polyanionic material to be deposited first onto the silicone hydrogel contact lens to form a layer and then the water-soluble polymeric material comprising azetidinium groups is bound to the layer of polyanionc material on the lens.

The in-package-coating solution preferably contains a buffering agent. The buffering agents maintain the pH preferably in the desired range after the lens is autoclaved, for example, in a physiologically acceptable range of from about 6.3 to about 7.8, preferably between 6.5 to 7.6, even more preferably between 6.8 to 7.4. Any known, physiologically compatible buffering agents can be used. Suitable buffering agents as a constituent of the packaging solution according to the invention are known to the person skilled in the art. Examples are: boric acid, borates, e.g. sodium borate, citric acid, citrates, e.g. potassium citrate, bicarbonates, e.g. sodium bicarbonate, phosphate buffers (e.g. $Na_2HPO_4$, $NaH_2PO_4$, $Na_2HPO_4$, and $KH_2PO_4$, TRIS (tris (hydroxymethyl)aminomethane), 2-bis(2-hydroxyethyl) amino-2-(hydroxymethyl)-1,3-propanediol, bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino) ethanesulfonic acid), MOPS 3-[N-morpholino]-propanesulfonic acid, PIPES (piperazine-N,N'-bis(2-ethanesulfonic acid), TES (N-[Tris(hydroxymethyl)methyl]-2-aminoethanesulfonic acid), and salts thereof. The amount of each buffer agent is that amount necessary to be effective in achieving a desired pH. Typically, it is present in an amount of from 0.001% to 2%, preferably from 0.01% to 1%; most preferably from about 0.05% to about 0.30% by weight.

The packaging solution is formulated in such a way that they are isotonic with the lachrymal fluid. A solution which is isotonic with the lachrymal fluid is generally understood to be a solution whose concentration corresponds to the concentration of a 0.7% to 0.9% sodium chloride solution.

The isotonicity with the lachrymal fluid, or even another desired tonicity, may be adjusted by adding organic or inorganic substances which affect the tonicity. Suitable occularly acceptable tonicity agents include, but are not limited to sodium chloride, potassium chloride, glycerol, sorbitol, xylitol, mannitol, propylene glycol, polyethylene glycol (PEG) with a molecular weight of about 400 Da or less, and mixtures thereof. The tonicity of the solution is typically adjusted to be in the range from about 200 to about 450 milliosmol (mOsm), preferably from about 200 to 450 mOsm, preferably from about 250 to 350 mOsm.

In accordance with the present invention, first step, an in-package-coating solution can be prepared in a variety of ways. For example, preferably, a polyanionic material solution can be formed by dissolving a polyanionic material in water. Once dissolved, the pH of the polyanionic material solution is adjusted to a desired pH (e.g. 1-4), preferably pH about 2, by adding an acid such as HCL. On the other hand, second step, an in-package-saline solution is prepared by adding desirable amount polyamidoamine-epichlorohydrin (PAE) and a desirable type and amount of hydrophilicity-enhancing agent in a buffer solution, for example, a Phosphate buffered saline (PBS) and adjust the pH to 7.2~7.4. The desirable amount polyamidoamine-epichlorohydrin (PAE) and the desirable type and amount of hydrophilicity-enhancing agent are as disclosed previously in this patent application. For example, the hydrophilicity-enhancing agent can be polyacrylamide-poly(acrylic acid) (PAAm-PAA) copolymer. Then the in-package-saline solution is heat pre-reacted for about 0.3 hours even more preferably from about 2 hours to about 12 hours to form water-soluble and thermal-crosslinkable hydrophilic polymeric material azetidinium groups. After pre-reaction, the saline is cooled down to room temperature. Then, for the third step, mix the in-package-saline solution with the polyanionic material solution. The volume ratio of the polyanionic material solution/in-package-saline solution is chosen to achieve a molar charge ratio of the polyanionic material to the thermal-crosslinkable hydrophilic polymeric material azetidinium groups ranges preferably from 1:100 to 100:1. The pH of the mixture is adjusted to a desired pH (e.g. 1-4), preferably pH about 2. Fourth step, a hydrolysable-at-autoclave material and a tonicity agent is added to the mixture of polyanionic material solution and the in-package-saline solution to form an in-package-coating solution. Please note the above sequence of steps for preparing an in-package-coating solution is just for illustration purpose. Many different sequence of step can be chosen to achieve the desired results. For example, a hydrolysable-at-autoclave material and/or a tonicity agent can be added to the polyanionic material solution.

A silicone hydrogel lens can be simple immersed in the in-package-coating solution, sealed and autoclaved at a condition disclosed above in the present application.

"The concentration of the water-soluble and thermally-crosslinkable hydrophilic polymeric material having azetidinium groups in an in-package-coating solution can generally vary depending on the particular materials being utilized, the desired coating thickness, and a number of other factors. It may be typical to formulate a relatively dilute aqueous solution of a coating material. In a preferred embodiment, the in-package-coating solution comprises preferably from about 0.01% to about 4%, more preferably from about 0.05% to about 3%, even more preferably from about 0.1% to about 2%, most preferably from about 0.1% to about 1%, by weight of the water-soluble and thermally-crosslinkable hydrophilic polymeric material having azetidinium groups of the invention.

In order to alter various characteristics of the coating, such as thickness, the molecular weight of the coating materials can be varied. In particular, as the molecular weight is increased, the coating thickness generally increases.

In another aspect, the invention provides a method for applying an ophthalmic product having a lubricous and wettable surface, comprising the steps of:

(1) obtaining a silicone hydrogel contact lens,
(2) placing the silicone hydrogel contact lens in a lens package containing an polyanionic polymer solution for more than 10 seconds to form a layer of the polyanionic polymer coating on the hydrogel contact lens, wherein the polyanionic polymer having carboxyl groups and the solution having a pH of 1.0 to 4.0, and then
(3) adding a water-soluble and thermal-crosslinkable polymeric material comprising azetidinium groups to the lens package of the step (2) containing the polyanionic polymer solution to form an in-package-coating solution, provided that the molar charge ratio of the polyanionic polymer and the water-soluble and thermal-crosslinkable polymeric material comprising azetidinium groups is from 1:100 to 100:1 and no precipitation is formed after mixing, wherein the in-package-coating solution having a pH higher than 6,
(4) sealing the lens package with the contact lens and the in-package-coating solution,
(6) autoclaving said package with the contact lens and the in-package-coating solution therein, thereby inducing crosslinking reaction between azetidinium groups of the water-soluble and thermal-crosslinkable polymeric material and the carboxyl groups of the polyanionic polymer to form an in-package crosslinked hydrophilic coating on the surface of the silicone hydrogel contact lens, wherein the silicone hydrogel contact lens with the crosslinked hydrophilic coating thereon has a surface wettability characterized by having an averaged water contact angle of about 80 degrees or less and having improved lubricity as compared to uncoated lenses.

In this aspect of the invention, there is no need to add at least one decomposable-at-autoclave material. In this aspect of the invention, a silicone hydrogel lens is simply immersed in a lens package (a vial or a blister) containing an polyanionic polymer solution for a period of time sufficiently to form a layer of the polyanionic polymer coating on the hydrogel contact lens, wherein the polyanionic polymer having carboxyl groups and the solution having a pH of 1.0 to 4.0. It may be typical to formulate a relatively dilute aqueous solution of a polyanionic polymer material. For example, a polyanionic polymer coating material concentration can be between about 0.0001% to about 1% by weight, between about 0.005% to about 0.5% by weight, or between about 0.01% to about 0.1% by weight. The period of time for immersing the hydrogel lens in the lens package containing a polyanionic polymer solution ranges from 1 second to 6 hours, more preferably from 3 seconds to 30 minutes, even more preferably from 4 seconds to 20 minutes, most preferably from 5 seconds to 15 minutes. In this aspect of the invention, the in-package-coating solution having appropriate osmolarity and a preferably pH higher than 6, more preferably higher than 7, even more preferably higher than 8, most preferably equal to 9 or higher than 9 by adding appropriate amount of diluted NaOH solution before the use. A person of skill in the art knows how to select the pH for the in-package-coating solution for this aspect of the invention to achieve a pH of the in-package-coating solution around 7 after autoclave and also appropriate osmolarity (e.g. around 300 mOsm) after autoclave.

In this aspect of the invention, after the treatment, the lubricity of the treated lens is improved and the contact angle decreased significantly. In addition, the coating durability is good as demonstrated as follows: for example, the treated lens was tested with 15 cycles and 30 cycles of digital rubbing using PBS. The lubricity rating remains to be 0 after 15 cycles and increases slightly to 1 after 30 cycles. The contact angle also increased (from 38 degrees before digital rubbing to 45 degrees after 15 cycles of digital rubbing and to 55 degrees after 30 cycles of digital rubbing) but remained to be significantly lower than that of uncoated lenses (116 degrees).

Above described various embodiments and preferred embodiments of packages, coating techniques, coating materials, and coating temperature can be used in this aspect of the invention.

The silicone hydrogel contact lens comprises a core silicone hydrogel material which is the copolymerization product of a silicone hydrogel lens-forming material. The silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof.

Silicone hydrogel contact lenses can be produced according to any known methods. Examples of lens-producing methods include without limitation lathing, cast molding, spin casting, and combinations thereof.

The silicone hydrogel contact lens after autoclave preferably has one of the following properties: an oxygen permeability of at least 40 barres, an ion permeability characterized by having an Ionoflux Diffusion Coefficient of greater than about $1.5 \times 10^{-6}$ mm$^2$/min, wettable surface characterized by an averaged water contact angle of 80 degrees or less and a good coating durability characterized by surviving a digital rubbing test or repeated autoclave test.

The previous disclosure will enable one having ordinary skill in the art to practice the invention. In order to better enable the reader to understand specific embodiments and the advantages thereof, reference to the following examples is suggested.

Example 1

Lubricity Evaluation

The lubricity rating is a qualitative ranking scheme where 0 is assigned to control lenses coated with polyacrylic acid, 1 is assigned to Oasys™/TruEye™ commercial lenses and 4 is assigned to commercial Air Optix™ lenses. The samples are rinsed with excess DI water for at least three times and then transferred to PBS before the evaluation. Before the evaluation, hands are rinsed with a soap solution, extensively rinsed with DI water and then dried with KimWipe® towels. The samples are handled between the fingers and a numerical number is assigned for each sample relative to the above standard lenses described above. For example, if lenses are determined to be only slightly better than Air Optix™ lenses, then they are assigned a number 3. For consistency, all ratings are independently collected by the same two operators in order to avoid bias and the data reveal good qualitative agreement and consistency in the evaluation.

Surface Wettability Tests.

Water contact angle on a contact lens is a general measure of the surface wettability of the contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity>18 MΩcm and the droplet volume used is 2 ml. Typically, uncoated silicone hydrogel lenses (after autoclave) may have a sessile drop contact angle as high as 120 degrees. The tweezers and the pedestal are washed well with Isopropanol and rinsed with DI water before coming in contact with the contact lenses.

Water Break-Up Time (WBUT) Tests.

The surface hydrophilicity of the lenses (after autoclave) is assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held with tweezers against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT≥5 seconds are considered good hydrophilicity and are expected to exhibit adequate ability to support the tear film on-eye Coating Durability Tests The lenses are digitally rubbed with PBS solution for 15 or 30 times and then rinsed with saline. The above procedure is repeated for a given times, e.g., from 1 to 30 times, (i.e., number of consecutive digital rubbing tests along with PBS rinse in between rubbing)). The lenses are then subjected to lubricity test and surface wettability test as described above. For examine whether the coating is still intact. To survive digital rubbing test, there is no significantly increased lubricity rating and the contact angle is still much lower that uncoated lens.

Example 2

A 0.02% poly (mthylacrylic acid) (PMAA) solution is prepared by dissolving appropriate amount of PMAA powder into water. Once dissolved, the pH of the PMAA solution is adjusted to desired pH (e.g., ~2) by adding HCl.

An in-packaging coating (IPC) saline is prepared by adding 0.08% polyamidoamine-epichlorohydrin (PAE) and 0.07% polyacrylamide-poly(acrylic acid) (PAAm-PAA) copolymer in PBS and adjust the pH to 7.2~7.4. Then the saline is heat pre-reacted for about 6 hrs at 60° C. After pre-reaction, the saline is cooled down to room temperature. This IPC saline is referred to as IPC-#1

An IPC saline is prepared by mixing IPC-#1 solution into PMAA solution. The volume ratio of PMAA/IPC-#1 used in this set of experiments is 4 to 1. After mixing IPC-#1 into PMAA with the desired ratio, the pH is adjusted to 2. 0.07% of urea and 0.7% NaCl is then added to the IPC solution.

A silicone hydrogel made from silicone-containing macromer is used in this set of experiments. A lens is simply immersed in a package shell with an IPC solution, sealed and autoclaved for 30 min.

The lens properties are tested and listed in following table. The lubricity improved from 3.5 to 3. The contact angel decreased from 91 for uncoated lens control (autoclaved in PBS) to 55 for lens with IPC coating.

| PMAA/IPC-#1 vol. ratio | Starting pH | pH after autoclave | WBUT (sec) | Lubricity | Contact angle |
|---|---|---|---|---|---|
| n/a (PBS control) | 7.2 | 7.2 | 0 | 3.5 | 91 |
| 4:1 | 2.5 | 6.83 | 11 | 3 | 55 |

Example 3

A 0.02% or 0.04% poly(acrylic acid) (PAA) solution is prepared by dissolving appropriate amount of PAA powder into water. Once dissolved, the pH of the PAA solution is adjusted to desired pH (e.g., ~2) by adding HCl.

An in-packaging-coating (IPC) saline is prepared by adding 0.08% polyamidoamine-epichlorohydrin (PAE) and 0.07% polyacrylamide-poly(acrylic acid) (PAAm-PAA) copolymer in phosphate buffered saline (PBS) and 1.4% NaCl, and adjust the pH to 7.2~7.4. Then the saline is heat pre-reacted for about 6 hrs at 60° C. After pre-reaction, the saline is cooled down to room temperature. The pH of the saline is adjusted to 9 by adding appropriate amount of diluted NaOH solution before the point-of-use. This IPC saline is referred to as IPC-#2

Silicone hydrogel lens, lotrafilcon B, is used in this set of experiments. Uncoated Lotrafilcon B lenses were soaked in DI water before being used in the IPC plus coating.

A lens is simply immersed in a vial with 1.5 ml of 0.02% or 0.04% PAA solution (pH~2) for a certain period of time (e.g. 1 min, 2 min, 4 min, 8 min, 15 min, etc.). Then without discarding any of the PAA solution, 1.5 ml of IPC saline described above (IPC #2) was added to the vial and the vial is sealed and autoclaved at 121° C. for 45 minutes. After autoclave, the pH of the packaging saline is around 7 and the osmolality is about 300 mOsm The lens properties are tested and listed in following table. The lubricity improved from 4 to 0 and remained to be 0 after second autoclave. The contact angle decreased significantly after IPC plus (IPD+IPC) coating

| No. | Lens Type | IPD Solution | Dip time (min) | Saline | Lubricity | Contact Angle | Lubricity after second autoclave |
|---|---|---|---|---|---|---|---|
| 1 | Lotrafilcon B | N/A | 0 | PBS | 4 | 116 | 4 |
| 2 | | 0.02% | 2 | IPC-#2, | 0 | 38 | 0.5 |
| 3 | | PAA in Water | 4 | pH 9 | 0 | 29 | 0 |
| 4 | | 0.04% | 2 | | 0 | 36 | 0 |

-continued

| No. | Lens Type | IPD Solution | Dip time (min) | Saline | Lubricity | Contact Angle | Lubricity after second autoclave |
|-----|-----------|--------------|----------------|--------|-----------|---------------|----------------------------------|
| 5 | | PAA in | 4 | | 0 | 40 | 0 |
| 6 | | Water | 8 | | 0 | 38 | 0 |

Example 4

A 0.04% poly(acrylic acid) (PAA) solution is prepared by dissolving appropriate amount of PAA powder into water. Once dissolved, the pH of the PAA solution is adjusted to desired pH (e.g., ~2) by adding HCl.

An in-packaging-coating (IPC) saline is prepared by adding 0.08% polyamidoamine-epichlorohydrin (PAE) and 0.07% polyacrylamide-poly(acrylic acid) (PAAm-PAA) copolymer in phosphate buffered saline (PBS) and 1.4% NaCl, and adjust the pH to 7.2~7.4. Then the saline is heat pre-reacted for about 6 hrs at 60° C. After pre-reaction, the saline is cooled down to room temperature. The pH of the saline is adjusted to 9 by adding appropriate amount of diluted NaOH solution before the point-of-use. This IPC saline is referred to as IPC-#2

Silicone hydrogel lens, lotrafilcon B, is used in this set of experiments. Uncoated Lotrafilcon B lenses were soaked in DI water before being used in the IPC plus coating.

A lens is simply immersed in a propylene packaging shell with 0.325 ml of 0.04% PAA solution (pH~2) for a certain period of time (e.g. 4 min, 8 min, 15 min, etc.). Then without discarding any of the PAA solution, 0.3 ml of IPC saline described above (IPC #2) was added to the shell and the shell is sealed and autoclaved at 121° C. for 45 minutes.

The lens properties are tested and listed in following table. The lubricity improved from 4 to 0. The contact angle decreased significantly after IPC plus (IPD+IPC) coating.

| No. | Lens Type | IPD Solution | Dip time (min) | Saline | Lubricity* | Contact Angle |
|-----|-----------|--------------|----------------|--------|------------|---------------|
| 1 | Lotrafilcon B | N/A | 0 | PBS | 4 | 115 |
| 2 | | 0.04% PAA in | 4 | IPC-#2, | 0 | 42 |
| 3 | | Water | 8 | pH 9 | 0 | 40 |
| 4 | | | 15 | | | 43 |

*Lubricity is measured by finger lubricity with a qualitative scale of 0 (best) to 4 (worst)

From the above examples 1-4, the present invention in-package-coating process not only reduce contact angle of the treated lens but also improve the lubricity of the treated lens.

Example 5

A 0.04% poly(acrylic acid) (PAA) solution is prepared by dissolving appropriate amount of PAA powder into water. Once dissolved, the pH of the PAA solution is adjusted to desired pH (e.g., ~2) by adding HCl.

An in-packaging-coating (IPC) saline is prepared by adding 0.08% polyamidoamine-epichlorohydrin (PAE) and 0.07% polyacrylamide-poly(acrylic acid) (PAAm-PAA) copolymer in phosphate buffered saline (PBS) and 1.4% NaCl, and adjust the pH to 7.2~7.4. Then the saline is heat pre-reacted for about 6 hrs at 60° C. After pre-reaction, the saline is cooled down to room temperature. The pH of the saline is adjusted to 9 by adding appropriate amount of diluted NaOH solution before the point-of-use. This IPC saline is referred to as IPC-#2

Silicone hydrogel lens, lotrafilcon B, is used in this set of experiments. Uncoated Lotrafilcon B lenses were soaked in DI water before being used in the IPC plus coating.

A lens is simply immersed in a vial with 1.5 ml of 0.04% PAA solution (pH-2) for a certain period of time (8 min). Then without discarding any of the PAA solution, 1.5 ml of IPC saline described above (IPC #2) was added to the vial and the vial is sealed and autoclaved at 121° C. for 45 minutes. After autoclave, the pH of the packaging saline is around 7 and the osmolality is about 300 mOsm The lubricity improved from 4 to 0. The contact angle decreased significantly after IPC plus (IPD+IPC) coating.

The coating durability was tested with 15 cycles and 30 cycles of digital rubbing using PBS. The lubricity rating remains to be 0 after 15 cycles and increases slightly to 0.5 after 30 cycles. The contact angle also increased (from 38 degrees before digital rubbing to 45 degrees after 15 cycles of digital rubbing and to 55 degrees after 30 cycles of digital rubbing) but remained to be significantly lower than that of uncoated lenses (116 degrees).

Example 6

A 0.04% poly(acrylic acid) (PAA) solution is prepared by dissolving appropriate amount of PAA powder into water. Once dissolved, the pH of the PAA solution is adjusted to desired pH (e.g., ~2) by adding HCl.

IPC-3X saline is prepared by a process similar for preparing IPC-#2, by replacing PAAm-PAA with PAAm-PAPMA. PAAM-PPMA is prepared by copolymerizing acrylamide with N-(3-aminopropyl)methacrylamide (APMA).

In previous example, the package saline remains to be clear after adding IPC-#2 to PAA solution. For IPC-3x, the mixture turns to hazy or hazy with precipitates after adding IPC-3X to PAA solution.

| 0.04% PAA vol(ml) | IPC-3X vol (ml) | PAA:IPC ratio | Observation after adding IPC |
|-------------------|-----------------|---------------|------------------------------|
| 1.8 | 1.2 | 1.5:1 | hazy, precipitates |
| 2 | 1 | 2:1 | hazy, precipitates |

-continued

| 0.04% PAA vol(ml) | IPC-3X vol (ml) | PAA:IPC ratio | Observation after adding IPC |
|---|---|---|---|
| 2.25 | 0.75 | 3:1 | hazy, few particulates |
| 2.4 | 0.6 | 4:1 | hazy, few particulates |
| 2.54 | 0.46 | 5.5:1 | hazy |
| 2.7 | 0.3 | 9:1 | hazy |

Example 7

A 0.04% poly(acrylic acid) (PAA) solution is prepared by dissolving appropriate amount of PAA powder into water. Once dissolved, the pH of the PAA solution is adjusted to desired pH (e.g., ~2) by adding HCl.

IPC-4C saline is prepared by a process similar for preparing IPC-#2, but by replacing PAAm-PAA with PEG-SH. The mixture solution remains to be clear after adding IPC-4C to PAA solution.

Example 8

A poly(acrylic acid) (PAA) solution of different concentrations (0.4% to 1%) is prepared by dissolving appropriate amount of PAA powder into water. Once dissolved, the pH of the PAA solution is adjusted to desired pH (e.g., ~2) by adding HCl.

The mixture solution either remains clear or becomes slightly hazy or hazy after adding different amount of IPC-#2 to PAA solutions of different concentrations, as summarized in this table.

| PAA conc (%) | PAA vol. (ml) | IPC-#2 vol. (ml) | vol. ratio | Observation |
|---|---|---|---|---|
| 0.4 | 2 | 2 | 1:1 | Clear |
| 0.6 | 2 | 2 | 1:1 | Clear |
| 0.8 | 2 | 2 | 1:1 | Very slightly hazy |
| 1.0 | 2 | 2 | 1:1 | Very slightly hazy |
| 1.0 | 2 | 1 | 2:1 | Slightly hazy |
| 1.0 | 3 | 1 | 3:1 | Hazy |
| 1.0 | 2 | 0.5 | 4:1 | Hazy |
| 1.0 | 3 | 0.5 | 6:1 | slightly hazy |
| 1.0 | 1.8 | 0.2 | 9:1 | Slightly hazy |
| 1.0 | 3.8 | 0.2 | 19:1 | Very slightly hazy |

These examples illustrated to the skills in art that appropriate ratio of polyanionic polymer and the water-soluble and thermally-crosslinkable polymer materials can be adjusted to avoid precipitation in the IPC plus coating process

What is claimed is:

1. A method for applying an ophthalmic product having a lubricous and wettable surface, comprising the steps of:
   (1) obtaining a silicone hydrogel contact lens,
   (2) placing the silicone hydrogel contact lens in a lens package containing an in-package-coating solution, wherein the in-package-coating solution comprises:
   (A) a polyanionic polymer having carboxyl groups,
   (B) at least one water-soluble and thermally-crosslinkable polymeric material comprising azetidinium groups,
   (C) at least one decomposable-at-autoclave material, wherein the in-package-coating solution has a pH of from about 1.0 to about 4.0, provided that the molar charge ratio of the polyanionic polymer and the water-soluble and thermal-crosslinkable polymeric material comprising azetidinium groups is from 1:100 to 100:1 and no precipitation is formed after mixings, wherein the polyanionic polymer attaching and forming at least one layer coating on the surface of the silicone hydrogel contact lens,
   (3) sealing the lens package with the contact lens and the in-package-coating solution having the pH of from about 1.0 to about 4.0,
   (4) autoclaving said package with the contact lens and the in-package-coating solution therein, thereby inducing crosslinking reaction between azetidinium groups of the water-soluble polymeric material and the carboxyl groups of the polyanionic polymer to form a crosslinked hydrophilic coating on the surface of the silicone hydrogel contact lens immersed in the in-package-coating solution, wherein the decomposable-at-autoclave material is hydrolyzed to increase the pH to 6.5 to 7.5, wherein the silicone hydrogel contact lens with the crosslinked hydrophilic coating thereon has a surface wettability characterized by having an averaged water contact angle of about 80 degrees or less and having improved lubricity as compared to uncoated lenses.

2. The method of claim 1, wherein the decomposable-at-autoclave material is urea, ammonium carbamate, or combination thereof.

3. The method of claim 2, wherein the step of autoclaving is performed by heating the silicone hydrogel contact lens immersed in a packaging solution in a sealed lens package at a temperature of from about 118° C. to about 125° C. for approximately 20-90 minutes to form the crosslinked hydrophilic coating on the silicone hydrogel contact lens, wherein the packaging solution comprises at least one buffering agent in an amount sufficient to maintain a pH of from about 6.0 to about 8.5 and has a tonicity of from about 200 to about 450 milliosmol (mOsm) and a viscosity of from about 1 centipoise to about 20 centipoises at 25° C.

4. The method of claim 1, wherein the water-soluble and thermally-crosslinkable polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, and combination thereof.

5. The method of claim 4, wherein the hydrophilic polymer as the hydrophilicity-enhancing agent is a copolymer which is a polymerization product of a composition comprising (1) about 60% by weight or less by weight of at least one reactive vinylic monomer and (2) at least one non-reactive hydrophilic vinylic monomer and/or at least one phosphorylcholine-containing vinylic monomer; or combinations thereof;

wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_{12}$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof;

wherein the non-reactive hydrophilic vinylic monomer is selected from the group consisting of acrylamide, methacrylamide, N,N-dimethylacrylamide, N,N-dimethylmethacrylamide, N-vinylpyrrolidone, N,N,-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl) methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

6. The method of claim 4, wherein the weight average molecular weight $M_w$ of the hydrophilic polymer as the hydrophilicity-enhancing agent is from about 500 to about 1,000,000.

7. The method of claim 4, wherein the molar charge ratio of the polyanionic material to the water soluble and thermal-crosslinkable hydrophilic polymeric material azetidinium groups is from 1:20 to 20:1.

* * * * *